(12) United States Patent
Cureau et al.

(10) Patent No.: US 9,008,305 B2
(45) Date of Patent: Apr. 14, 2015

(54) VIDEO DATA DELIVERY PROTECTION

(71) Applicant: Startal, Inc., Los Angeles, CA (US)

(72) Inventors: Kyle Emile Cureau, San Francisco, CA (US); Michael James Pritchard, Reston, VA (US)

(73) Assignee: Startal, Inc., Santa Monica, CA (US)

( * ) Notice: Subject to any disclaimer, the term of this patent is extended or adjusted under 35 U.S.C. 154(b) by 32 days.

(21) Appl. No.: 13/843,341

(22) Filed: Mar. 15, 2013

(65) Prior Publication Data

US 2014/0270167 A1    Sep. 18, 2014

(51) Int. Cl.
| | |
|---|---|
| *H04N 7/167* | (2011.01) |
| *H04N 21/835* | (2011.01) |
| *H04N 21/4405* | (2011.01) |
| *H04N 21/466* | (2011.01) |

(52) U.S. Cl.
CPC ........... *H04N 7/1675* (2013.01); *H04N 21/835* (2013.01); *H04N 21/4405* (2013.01); *H04N 21/4667* (2013.01); *H04L 2209/72* (2013.01)

(58) Field of Classification Search
None
See application file for complete search history.

(56) References Cited

U.S. PATENT DOCUMENTS

| | | | |
|---|---|---|---|
| 8,688,991 B1 * | 4/2014 | Sunil .............................. | 713/176 |
| 2012/0110620 A1 * | 5/2012 | Kilar et al. ....................... | 725/34 |
| 2012/0284804 A1 * | 11/2012 | Lindquist et al. ................ | 726/29 |

OTHER PUBLICATIONS

Advanced Encryption Standard; Wikipedia; URL: http://en.wikipedia.org/wiki/AES128; Mar. 7, 2013; last modified Mar. 5, 2013; 10 pages.
Android (operating system); Wikipedia; http://en.wikipedia.org/wiki/Android_(operating_system); Mar. 7, 2013; last modified Mar. 6, 2013; 15 pages.
Content delivery network; Wikipedia; http://en.wikipedia.org/wiki/Content_delivery_network; Mar. 7, 2013; last modified Mar. 6, 2013; 7 pages.
Digital rights management; Wikipedia; http://en.wikipedia.org/wiki/Digital_rights_management; Mar. 7, 2013; Last modified Feb. 19, 2013; 14 pages.
HTTP Secure; Wikipedia; http://en.wikipedia.org/wiki/Https; Mar. 7, 2013; last modified Mar. 4, 2013; 9 pages.
iOS; Wikipedia; http://en.wikipedia.org/wiki/Ios; Mar. 7, 2013; last modified Mar. 4, 2013; 10 pages.
M3U; Wikipedia; http://en.wikipedia.org/wiki/M3U; Feb. 27, 2013; last modified Feb. 26, 2013; 4 pages.
Transport Layer Security; Wikipedia; http://en.wikipedia.org/wiki/Secure_Sockets_Layer; Mar. 7, 2013; last modified Mar. 6, 2013; 20 pages.

(Continued)

*Primary Examiner* — Fatoumata Traore
(74) *Attorney, Agent, or Firm* — Fish & Richardson P.C.

(57) ABSTRACT

An aspect of the subject matter described in this specification can be embodied in one or more computer-implemented methods that include obtaining a master playlist document including references to sub-playlist documents that reference video documents of different video quality for use in a video streaming on demand system, parsing the master playlist document to extract the references, digitally signing the references, generating a protected master playlist document from the digitally signed references, and providing the protected master playlist document for use in the video streaming on demand system.

12 Claims, 5 Drawing Sheets

(56) References Cited

OTHER PUBLICATIONS

SHA-2; Wikipedia; http://en.wikipedia.org/wiki/Sha2; Mar. 8, 2013;
Using HTTP Live Streaming; Apple, Inc.; iOS Developer Library; https://developerapple.com/library/ios/#documentation/NetworkingInternet/Conceptual/StreamingMediaGuide/UsingHTTPLiveStreaming/UsingHTTPLiveStreaming.html; Mar. 14, 2013; last update Apr. 1, 2011; 12 pages. last modified Feb. 23, 2013; 8 pages.
Encryption; Zencoder; https://app.zencoder.com/docs/api/encoding/encryption; copyright 2008-2013; Mar. 14, 2013; 2 pages.

* cited by examiner

VIDEO DATA DELIVERY PROTECTION

BACKGROUND

This specification describes systems and methods relating to protecting video data delivery, such as added protection for streaming of video in a video on demand system.

Android and iOS both make use of the M3U system of playlists for video streaming, in which a master playlist is read by the app (mobile device application program). This master playlist contains a list of playlists corresponding to video data of different quality levels. This allows the app to select the best quality video for the given bandwidth and quality of connection to the server hosting the video files, and change this selection dynamically. The video is broken up into hundreds of video fragments that are referenced by these playlists (.ts files). In this setup, DRM (Digital Rights Management) is typically not supported. Instead, to secure the content, AES128 bit encryption is utilized. For the app to decrypt the video, a key is required. This key is referenced in the playlist files.

Typically, all the playlist and video files in such a system are publicly available over computer networks, such as the Internet. To address the security issues created by this, some software developers use a scheme that requires authentication to access the decryption keys. Specifically, the URL (Universal Resource Locator) referencing a key can use SSL/HTTP (Secure Sockets Layer/Hypertext Transfer Protocol) with an authentication mechanism of one's choosing. However, this added level of security may not be sufficient, such as if an attacker obtains access to a master playlist file after legitimately purchasing a video product online.

SUMMARY

This specification describes systems and methods relating to protecting video data delivery, such as added protection for streaming of video from a video on demand system. In some implementations, a video on demand system can automatically parse master playlist files on a regular basis, breaking them apart, and signing all component URLs so that they expire within a specified time frame. This can be done recursively, meaning that not only are the variant playlist files of the master playlist signed, but the many components of each variant are also signed.

In general, an aspect of the subject matter described in this specification can be embodied in one or more computer-implemented methods that include obtaining a master playlist document including references to sub-playlist documents that reference video documents of different video quality for use in a video streaming on demand system, parsing the master playlist document to extract the references, digitally signing the references, generating a protected master playlist document from the digitally signed references, and providing the protected master playlist document for use in the video streaming on demand system. Each of the sub-playlist documents can include sub-playlist references to encrypted video fragments and a decryption key, and the method(s) can include obtaining the sub-playlist documents, and parsing each of the sub-playlist documents to extract the sub-playlist references and digitally signing the sub-playlist references.

The references to the sub-playlist documents and the sub-playlist references to encrypted video fragments can be Universal Resource Locators (URLs). The method(s) can include digitally signing the URLs such that they expire within a specified time frame. Moreover, the digitally signing can be repeated periodically, or dynamically, for example, using different private encryption keys.

An aspect of the subject matter described in this specification can also be embodied in one or more computer-implemented methods that include requesting video in a content delivery system, receiving a master playlist document for the requested video, where the master playlist document includes digitally signed references to sub-playlist documents that reference video documents, selecting a digitally signed reference from the master playlist document, performing authentication with a server computer using the selected digitally signed reference, accessing a sub-playlist document corresponding to the selected digitally signed reference after the authentication, and playing the video using the sub-playlist document.

The sub-playlist document can include digitally signed sub-playlist references to encrypted video fragments, and playing the video using the sub-playlist document can include, for each of the digitally signed sub-playlist references selected during the playing, performing authentication using the selected digitally signed sub-playlist reference, retrieving an encrypted video fragment corresponding to the selected digitally signed sub-playlist reference after the authentication for the digitally signed sub-playlist reference, decrypting the encrypted video fragment, and displaying the decrypted video fragment.

The master playlist document can be dynamically generated, and the method can include receiving a digitally signed Universal Resource Locator (URL) to the master playlist document, and requesting the master playlist document using the digitally signed URL before receipt of the master playlist document. The digitally signed URL can be encoded using an identifier of the device that requested the video. In addition, the digitally signed URL can be set to expire after a specified time frame.

Other embodiments include corresponding systems, apparatus, and one or more computer program products, i.e., one or more modules of computer program instructions encoded on a non-transitory computer-readable medium for execution by, or to control the operation of, data processing apparatus. For example, an aspect of the subject matter described in this specification can be embodied in a system that includes a storage device, and a processor programmed to obtain a master playlist document including references to sub-playlist documents that reference video documents, parse the master playlist document to extract the references, digitally sign the references, generate a protected master playlist document from the digitally signed references, and store the protected master playlist document in the storage device.

The system can include a server environment configured to provide video streaming on demand over a content distribution network, where the server environment includes the storage device and the processor. The system can include a computing device configured to request video from the server environment via the content distribution network, receive the protected master playlist document in response to the request, select a digitally signed reference from the protected master playlist document, perform authentication using the selected digitally signed reference, access a sub-playlist document corresponding to the selected digitally signed reference after the authentication, and play the video using the sub-playlist document.

Each of the sub-playlist documents can include sub-playlist references to encrypted video fragments, and the processor can be programmed to obtain the sub-playlist documents, and for each of the sub-playlist documents, parse the sub-playlist document to extract the sub-playlist references and digitally signing the sub-playlist references. The computing device can be configured to play the video using the sub-playlist document by performing operations including, for each of the digitally signed sub-playlist references selected from the sub-playlist document, performing authentication using the selected digitally signed sub-playlist reference, retrieving an encrypted video fragment corresponding to the selected digitally signed sub-playlist reference after the authentication for the selected digitally signed sub-playlist reference, decrypting the encrypted video fragment, and displaying the decrypted video fragment.

The references to the sub-playlist documents and the sub-playlist references to encrypted video fragments can be URLs. The processor can be programmed to digitally sign the URLs using an identifier of the computing device and such that they expire within a specified time frame. The processor can be programmed to digitally re-sign the references to the sub-playlist documents and the sub-playlist references periodically or dynamically. The processor can be programmed to generate the protected master playlist dynamically in response to the request, and the computing device can be configured to perform operations including receiving a digitally signed URL to the protected master playlist document, and requesting the protected master playlist document using the digitally signed URL before receipt of the protected master playlist document.

The digitally signed URL can be encoded using an identifier of the computing device and can be set to expire after a specified time frame. The content distribution network can include a mobile device network, and the computing device can include a mobile communication device. Moreover, the master playlist document and the sub-playlist documents can be records in a database implemented by the processor using the storage device.

Particular embodiments of the subject matter described in this specification can be implemented to realize one or more of the following advantages. The risks associated with an attacker obtaining a playlist file, and thus the URLs to the video files and the keys to decrypt them, can be reduced. Pirates can be prevented from accessing streaming video content over mobile devices, and attackers can be prevented from damaging the transmission of streaming video content. If an attacker obtains a master playlist, they will have what can be considered a "rotting apple" in that the file would be useless after a specified period of time. Attempting to reconstruct the file to prevent its imminent expiration will be difficult since an attacker would have to manually break out each variant, download those variants, and then repeat the process for all the playlist and key files, while also accomplishing all of this under the time constraint of the imminent expiration. To accomplish this, the attacker would have to reconstruct all these files in their original form, which may be significantly more difficult to do than to break AES encryption as it is currently used in video on demand (VOD) systems. Thus, by making the process of pirating a VOD video significantly more cumbersome, video data delivery protection can be improved. This increase in security can be realized using current systems that employ AES and HLS (HTTP Live Streaming), where a downloading protocol is used to realize video streaming.

The details of one or more embodiments of the subject matter described in this specification are set forth in the accompanying drawings and the description below. Other features, aspects, and advantages of the invention will become apparent from the description, the drawings, and the claims.

DETAILED DESCRIPTION

Figure 1:
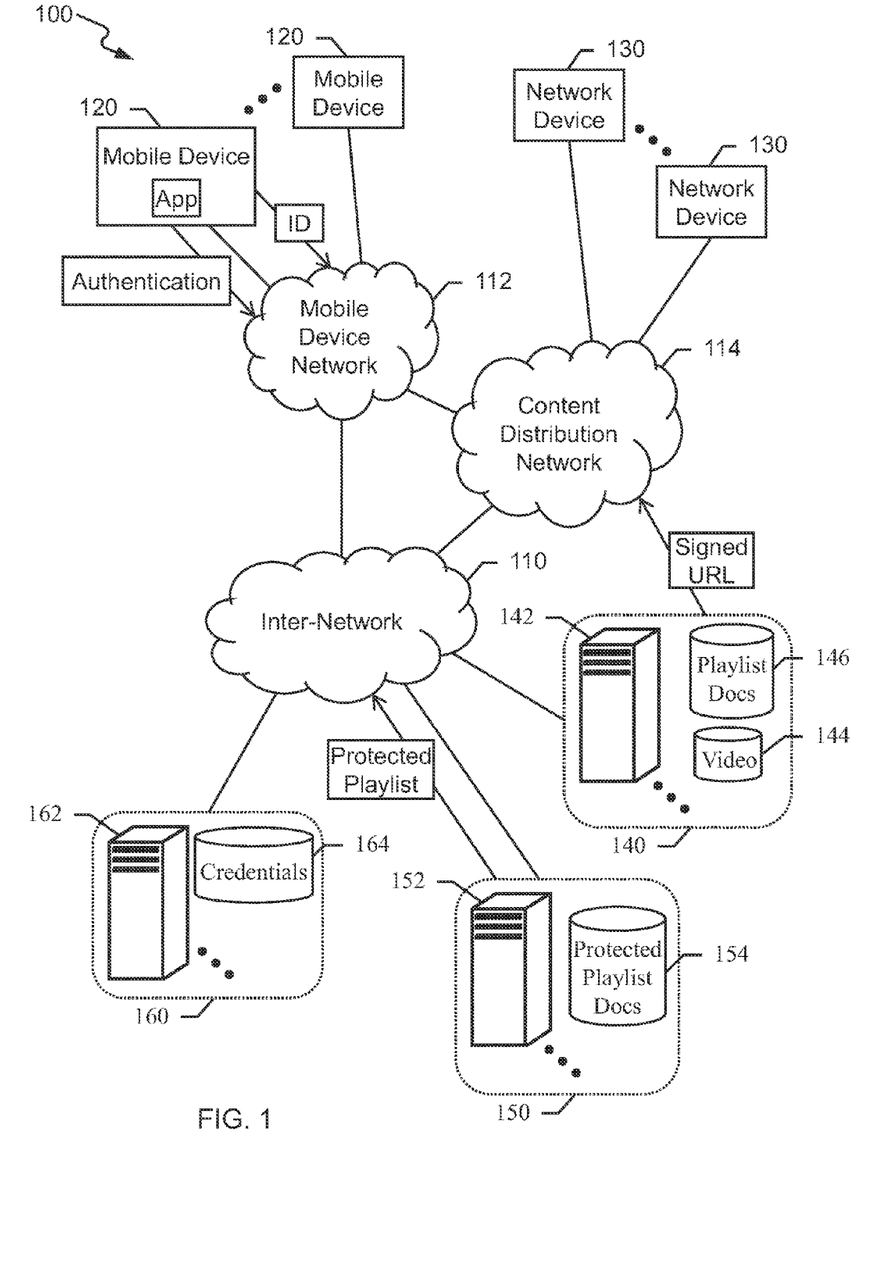
FIG. 1 shows an example of a content delivery system.

FIG. 1 shows an example of a content delivery system 100. The system 100 includes multiple mobile devices 120 (e.g., cell phones, smart phones, personal digital assistants (PDAs), tablet computers, etc.) that communicate through a mobile device network 112 (e.g., private cell phone networks and/or public wireless networks). The devices 120 are mobile in the sense that they can communicate using wireless transmissions (short, medium, or long range). However, the mobile devices 120 can also include connectors for wired communications (e.g., a Universal Serial Bus (USB) connector).

The content delivery system 100 can also include network devices 130 (e.g., desktop computers, Local Area Network (LAN) phones, game stations, networked televisions, etc.) that communicate through a wired inter-network 110 (e.g., the Internet). As will be appreciated, various types of network technologies can be employed, including but not limited to, cable systems, Integrated Services Digital Network (ISDN), enterprise networks, wide area networks, metropolitan area networks, and virtual private networks. For example, the system 100 can also employ a content distribution network (CDN) 114, which is a large distributed system of servers deployed in multiple data centers in the Internet to serve content to end-users with high availability and high performance (e.g., the CDN provided by Amazon.com Inc. of Seattle, Wash.). Thus, even though three networks 110, 112, 114 are shown in FIG. 1, it will be appreciated that any number of networks can be used, and these networks need not be viewed as explicitly distinct from one another. Moreover, even though the following discussion is presented in the context of a single mobile device 120, it will be appreciated that many different types of mobile devices 120 and network devices 130 can employ the systems and techniques described herein.

A mobile device 120 can include an App that was previously installed on the mobile device 120. This App can be designed to receive and play video data using the techniques described herein. In addition, this functionality can be coded in the App by the content provider, the App can be built separately and used with many different content providers, or the content provider can obtain a shell version of the App on which to build their own customized video player App that employs the techniques described herein. Thus, for example, the App can be a video player that is fully integrated with the operating system of the mobile device 120.

In some implementations, the App can initiate a video stream by providing a device identifier (ID) for the mobile device 120. This ID can be tied to network parameters of the device, device component information, or a combination of these. In response, a digitally signed Universal Resource Locator (URL) to a protected master playlist can be provided to the mobile device 120, where the signed URL has been encoded using the ID and is set to expire after a specified time frame. For example, a content provider server environment 140 can receive the ID and generate and return the digitally signed URL.

The content provider server environment 140 can include one or more server computers 142, video data 144, and playlist documents 146. As used herein, a "server environment" refers to any set of one or more server computers that operate in coordination with each other, regardless of configuration. Thus, a server environment includes inexpensive personal computers on a local area network and programmed with server software, blade servers, and server farms. In addition, although FIG. 1 shows server environments 140, 150, 160 as being separate from each other, it will be appreciated that, in some implementations, two or more of these server environments can be integrated with each other into a single server environment. For example, the playlist documents 146 and protected playlist documents 154 need not be stored separately as shown in FIG. 1. Thus, the server environments 140, 150, 160 can be operated by one party, two parties, or three separate parties (as shown) in various implementations.

In some implementations, the server environment 150 holds all the video and playlists and acts as a video on demand service for the content providers. For example, the server environment 150 can be programmed to allow a developer or client to upload video in any of various available formats, and the server environment 150 then handles the encoding and encryption of the video data, as well as the security features described herein, and in these implementations, it is the server environment 150 that holds the video 144 (and playlist documents 146, 154) and communicates with the App to show that the uploaded video is available for streaming.

The video data 144 can be encrypted video data retained in storage and accessible via the server computer(s) 142. The playlist documents 146 can be one or more master playlist documents and multiple sub-playlist documents, which can be stored in various formats, such as M3U or M3U8. In addition, as used herein, a "document" is an electronic document that need not correspond to a single file. A document may be stored in a portion of a file that holds one or more other documents, in a single file, or in two or more coordinated files. For example, a document may be one or more records in a database.

Once the mobile device App receives the signed URL, it can attempt to access a protected master playlist at a playlist protection server environment 150, which includes one or more server computers 152 and protected playlist documents 154. The mobile device App can be authenticated using a Certificate Authority (CA) server environment 160, which includes one or more server computers 162 and credentials 164. Once authentication is confirmed, the protected master playlist can be provided to the mobile device App.

As described in detail below, a number of different protections can be created for the master playlist document. In some implementations, the server environment 150 can employ a process of downloading, parsing, re-signing URLs, and reconstructing M3U8 files on a regular basis, so that if playlists are captured by an attacker, that attacker is subject to two significant obstacles to stealing the content: (1) a tremendous hassle involved in generating an unprotected version of the playlists(s), and (2) a time constraint for doing this due to self-expiring components.

In addition, in some implementations, the protected playlist documents are generated dynamically in response to a request. For example, when the App requests a video (e.g., issues a get_video command) the ID can be sent to the server environment 150. The server computer(s) 152 can then check that the App is registered with the system and that the user of the mobile device 120 has purchased the requested content (or the content is free). If these tests are passed, the signed URL can be returned to the App, where the signed URL points to a master playlist file (e.g., a M3U8 file) that is dynamically generated in response to that specific video request.

Figure 2A:
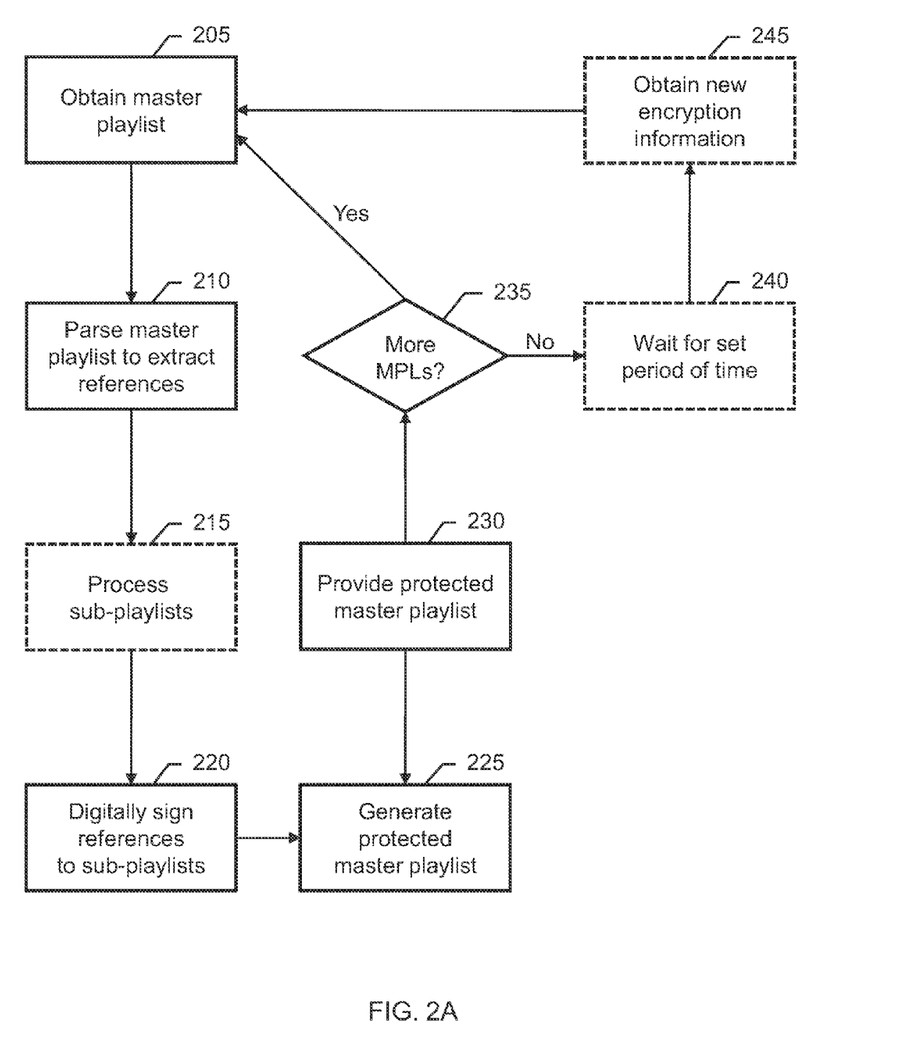
FIGS. 2A & 2B show examples of processes to protect playlist documents used in a video on demand system.

FIG. 2A shows an example of a process to protect master playlist documents in a video on demand system. At 205, a master playlist document is obtained. This can involve retrieving the master playlist document from a content provider via a network, or loading the master playlist document from a local storage device, e.g., a previously cached copy of the master playlist document retrieved from a content provider, or a previously generated master playlist when the playlist protection service also hosts playlists (and potentially the video files as well) for the content provider. The master playlist document includes references to sub-playlist documents, such as URLs in a 3MU8 file. The sub-playlist documents can include references to video documents of different video quality for use in the video streaming on demand system.

At 210, the master playlist document is parsed to extract the references to the sub-playlist documents. For example, the specific format of the master playlist document can be identified (e.g., there are three different formats for M3U8 files), and the master playlist document can be processed in accordance with the identified format to isolate the references (e.g., URLs) to other content. At 220, each of the references to the sub-playlist documents can be digitally signed. For example, the URLs to the sub-playlist documents can be digitally signed such that they expire within a specified time frame. Note that when expiring signed URLs are used, the process should be repeated regularly to that the expiring URLs are renewed.

Figure 2B:
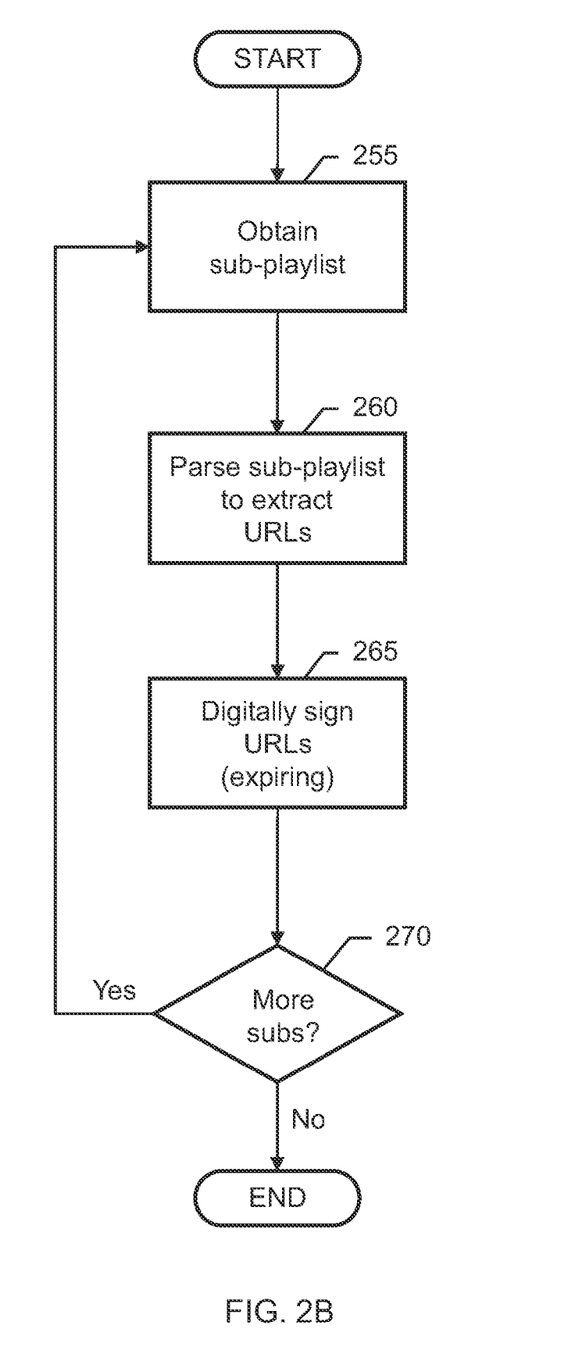

In addition, the digital signing of references can be recursively applied to one or more of the sub-playlist documents referenced by the master playlist document. For example, each of the sub-playlist documents referenced by the master playlist document can be processed at 215. FIG. 2B show an example of a processes to protect sub-playlist documents used in a video on demand system. The process begins at 255, when a first sub-playlist document is obtained (e.g., using the first sub-playlist reference extracted from a master playlist document).

The sub-playlist document can include references to encrypted video fragments and one or more decryption keys used to decrypt the encrypted video fragments. At 260, the sub-playlist document is parsed to extract the sub-playlist references. For example, all video components can be isolated by identifying every URL to encrypted video fragments (e.g., .ts files) in the sub-playlist document. At 265, the extracted sub-playlist references can be digitally signed. For example, each of the URLs to video fragments can be digitally signed such that they expire within a specified time frame. In addition, one or more references to one or more decryption keys (used to decrypt the encrypted video data) can also be digitally signed. The digitally signed references can be reinserted back into the sub-playlist document (overwriting the previous version of the reference) or added to a new sub-playlist document being generated.

Once the sub-playlist references are signed, a check can be made at 270 to see if more sub-playlist documents remain to be processed. If so, the next sub-playlist document is obtained and the process repeats. Once all the sub-playlist documents to be signed have been digitally signed, the process ends.

Returning to FIG. 2A, once the references to the sub-playlist documents (and potentially the sub-playlist references to video data) have been digitally signed, the protected master playlist document is generated at 225. As will be appreciated, this represents the end of generation of the document in that the document is finalized (e.g., the master M3U8 document is fully written in memory, with all appropriate formatting complete). Thus, creation of the protected master playlist document can be considered as including processing the sub-playlist documents at 215, digitally signing the references at 220, and generating the protected master playlist document at 225.

At 230, the protected master playlist document is provided to the system. This can involve saving the master playlist document (and potentially the sub-playlist documents) to disk in the local server environment, or sending the master playlist document (and potentially the sub-playlist documents) over a network to another server environment. Once the master playlist document is fully processed, a check can be made at 235 to see if additional master playlist documents remain to be processed. If so, the process repeats. If not, the process can wait for a set period of time at 240 before repeating. This waiting can be explicit or implicit. For example, the actual computer process can be terminated and then restarted after the set period of time. In any case, on a regular basis (e.g., every 30 minutes) multiple playlist documents (e.g., all M3U8 files protected by the system) can be parsed and have their references digitally signed anew. For example, a "cron job" can be used to implement a time-based job scheduler that initiates the process every X minutes. In some implementations, the "X" can be defined in terms of a reference to some other event.

In some implementations, one or more types of events can trigger generation of a protected playlist document dynamically. Such events can include a request to download a video, and a user uploading a video via a video management console. In some implementations, a job scheduler can be used to provide such dynamic triggering in connection with one or more time-based factors. For example, when a user requests a video, the system can check whether the video has been updated in the last 30 minutes; if not, the playlist protection process can be initiated; otherwise, the currently stored protected master playlist document can be delivered.

In addition, in some implementations, new encryption information can be obtained at 245 for use in the digital signing. For example, a new public-private key pair can be generated, and the new private encryption key can be used for a next round of digital signing. In some implementations, the digital signature process uses symmetric encryption rather than asymmetric encryption. In any case, obtaining new encryption information can be done again before each round, or less frequently.

In some implementations, all playlist documents are required to be private, and all accesses to files in the video on demand system require authentication. In this manner, even if an attacker obtains a key, they would still need to be given access to each file in turn, and in typical systems, there are hundreds of video fragments that are required. Thus, for the App to read any file, the App is given a temporary URL known as a signed URL for that specific file. This signed URL allows temporary access to the file, and as noted above, the URL can be encoded using the device ID. The URL will expire in a set time period (e.g., after 60 minutes). In effect, the playlist protection system acts as a gatekeeper to block potential attackers that wish to use video content inappropriately.

In addition, the particular details of the processes of parsing, re-signing, and reconstructing the playlist documents will depend in part on the formatting of the playlist documents used in a given implementation. In some implementations, a regex pattern is used that breaks apart M3U8 files and finds one of four different component formats. Taking the output of the regex, those components can be sanitizing and refining for use. Components can be retrieved from storage space and recursively handled, i.e., starting the process over from the regex pattern for the components of components.

The signing of the references can be performed using an internal service, using a third party service, or both. In some implementations, the reference (e.g., URL) signature should have both an access key and an expiration (e.g., using SHA2 technology). Moreover, in some implementations, when reconstructing the playlist documents with the signed references inserted therein, the sanitization and refining actions should be carefully undone to avoid inadvertently corrupting the documents. In some implementations, various robustness tests should be placed throughout the process to ensure quality.

In some implementations, robustness tests can include testing whether the master M3U8s and variant M3U8s conform to a certain pattern, contain certain key strings, are of proper length, contain proper file header information, or combination of such. Robustness tests can include testing whether the signed references themselves conform to a certain pattern. The M3U8s and/or .ts files can be tested against a audio/video codec library to ensure they are playable. The signed URLs can be tested to ensure they authenticate properly and/or are not expired. In some implementations, a verification can be performed to confirm that files are properly uploaded and downloaded to third party services, and/or are properly written/read to database(s). In addition, testing can be performed to confirm that a mobile device has properly played a video file, such as by having the mobile player send a tracking call 0:05 seconds into the video.

Figures 3A, 3B:
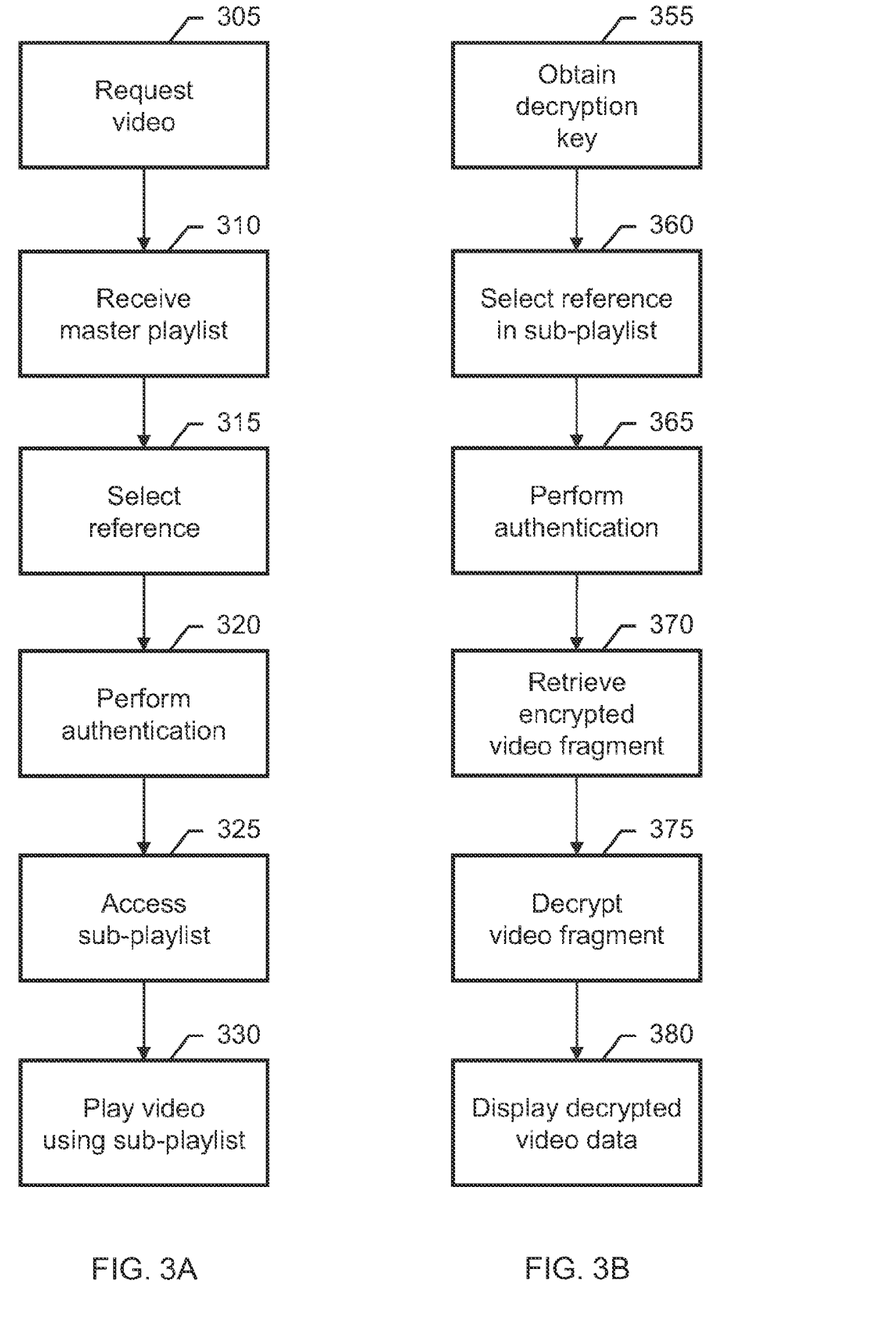
FIGS. 3A & 3B show examples of processes to access encrypted video.

FIG. 3A shows an example of a process to access encrypted video. At 305, video in a content delivery system is requested. For example, the request can be made via HTTPS (Hypertext Transfer Protocol Secure) using a signed URL on a CDN, as described above. At 310, a master playlist document for the requested video can be received at the requesting device, where the master playlist document includes digitally signed references to sub-playlist documents that reference video documents. At 315, a digitally signed reference from the master playlist document can be selected. For example, the different references in the master playlist document can correspond to sub-playlist documents that relate to different quality/bitrate versions of the video. As will be appreciated, a mobile device App can dynamically change the video quality being played based on the quality of the connection (e.g., Wi-Fi versus cell phone network).

At 320, authentication with a server computer is performed using the selected digitally signed reference. In some implementations, the master playlist document is dynamically generated, and all of the digitally signed references in the master playlist document are tied to the requesting device; thus, the authentication is also tied to the requesting device. At 325, the sub-playlist document corresponding to the selected digitally signed reference is accessed after the authentication. Then, the video is played using the sub-playlist document at 330.

FIG. 3B shows an example of a process to play encrypted video. At 355, a decryption key can be obtained. This can involve locating a URL in the sub-playlist document, where the URL can be digitally signed and require authentication to get access to the decryption key. At 360, a digitally signed reference is selected in the sub-playlist document. This can involve selecting the next URL to the next video fragment to be played. At 365, authentication is performed using the selected digitally signed sub-playlist reference. Further, in some implementations, the sub-playlist documents are dynamically generated, and all of the digitally signed references in the sub-playlist document are tied to the requesting device; thus, the authentication is also tied to the requesting device. However, the encrypted video fragments need not be re-encrypted dynamically.

At 370, an encrypted video fragment corresponding to the selected digitally signed sub-playlist reference is retrieved after the authentication for the digitally signed sub-playlist reference. At 375, the encrypted video fragment is decrypted. For example, the video fragment can be encrypted using AES128 bit encryption, and the decryption can correspond thereto. In some implementations, the video files can be encrypted using the encoding service provided by Zencoder, Inc. of San Francisco, Calif. (www.zencoder.com).

At 380, the decrypted video fragment is displayed on the device. Then, the process repeats for the next video fragment to be displayed. As will be appreciated, the process of FIG. 3B can include buffering of video data to facilitate smooth playback during the process, which can include requiring authentication for each and every reference to a video fragment.

Figure 4:
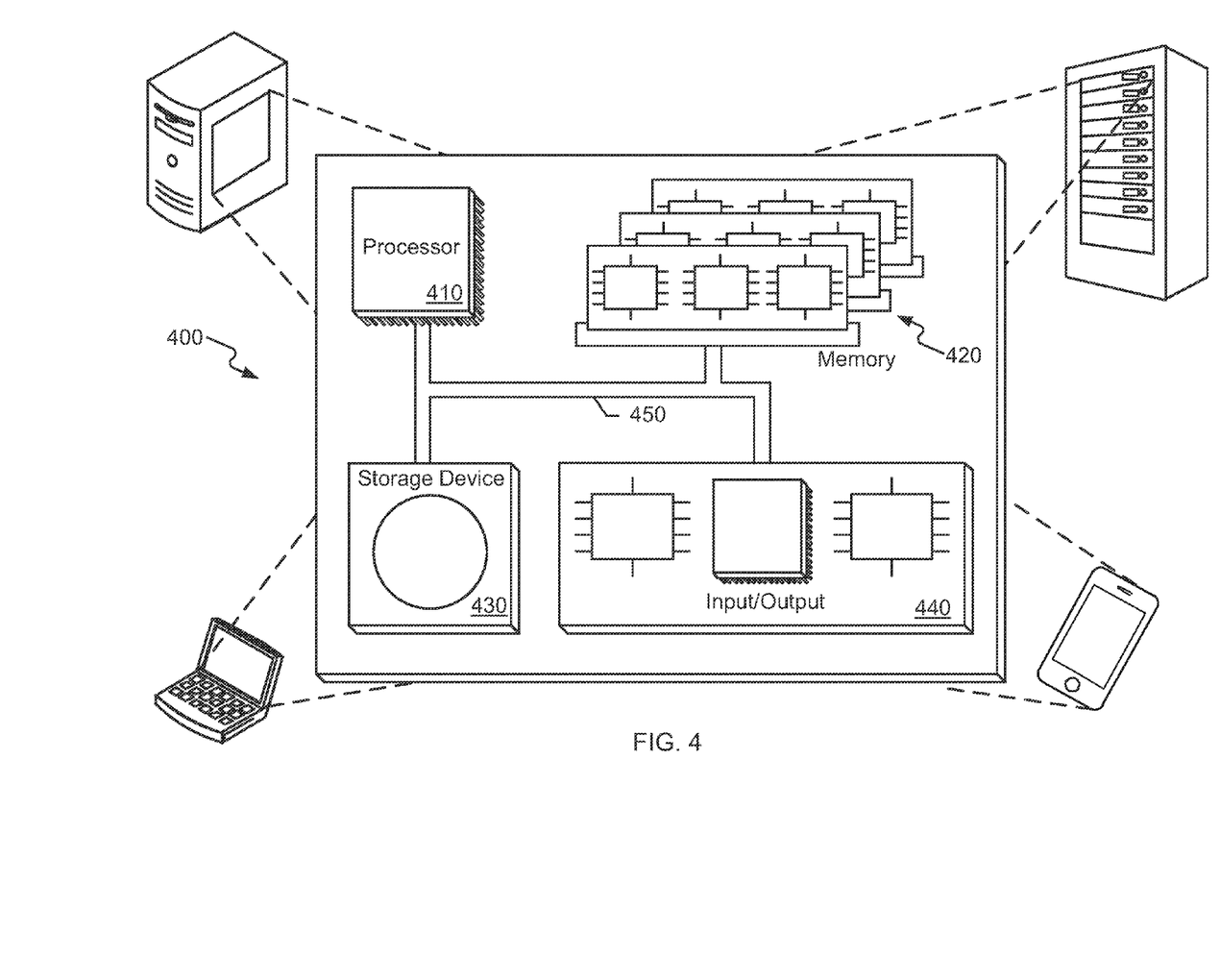
FIG. 4 shows an example of a computer system architecture, as can be used to implement the systems and techniques of FIGS. 1, 2A, 2B, 3A, & 3B.

FIG. 4 shows an example of a computer system architecture 400, as can be used to implement the systems and techniques of FIGS. 1, 2A, 2B, 3A, & 3B. For example, the system architecture 400 may be included in any or all of the mobile devices 120, the network devices 130, and the server environments 140, 150, 160. In addition, the computer system 400 can include a storage device 430, which can include a computer readable medium that encodes a computer program configured to cause data processing apparatus to perform operations as described above in connection with FIGS. 2A, 2B, 3A, and 3B.

The system 400 can include a processor 410, a memory 420, the storage device 430, and one or more input/output device 440. Each of the components 410, 420, 430, and 440 are interconnected using a system bus 450. The processor 410 is capable of processing instructions for execution within the system 400. In some implementations, the processor 410 is a single-threaded processor. In other implementations, the processor 410 is a multi-threaded and/or multi-core processor. The processor 410 is capable of processing instructions stored in the memory 420 or on the storage device 430 to display graphical information for a user interface on (or connected through) the input/output device(s) 440.

The memory 420 stores information within the system 400. In some implementations, the memory 420 is a computer-readable medium. In some implementations, the memory 420 is a volatile memory unit. In some implementations, the memory 420 is a non-volatile memory unit.

The storage device 430 is capable of providing mass storage for the system 400. In some implementations, the storage device 430 includes a computer-readable medium. For example, the storage device 430 can be a floppy disk drive, a hard disk drive, an optical disk drive, or a tape drive. In some implementations, the system 400 is a database system.

The input/output device(s) 440 provide input/output capability for the system 400. In some implementations, the input/output device(s) 440 include a keyboard and/or pointing device (or an interface to such). In some implementations, the input/output device(s) 440 include a display unit for displaying graphical user interfaces, such as a touch screen on a smart phone or a tablet computer.

In general, the features described can be implemented in digital electronic circuitry, or in computer hardware, firmware, software, or in combinations of them. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical discs; and optical discs. Storage devices suitable for tangibly embodying computer program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical discs; and optical discs (e.g., Digital Video Discs and Blu-ray discs). The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A method comprising:
   obtaining a master playlist document comprising references to sub-playlist documents that reference video documents of different video quality for use in a video streaming on demand system, wherein each of the sub-playlist documents includes sub-playlist references to encrypted video fragments and a decryption key;
   parsing, at a computer system, the master playlist document to extract the references to the sub-playlist documents, wherein the references to the sub-playlist documents and the sub-playlist references to encrypted video fragments are Universal Resource Locators (URLs);
   obtaining the sub-playlist documents;
   for each of the sub-playlist documents, parsing the sub-playlist document to extract the sub-playlist references;
   digitally signing the references to the sub-playlist documents and the sub-playlist references, which comprises digitally signing the URLs such that they expire within a specified time frame;
   generating a protected master playlist document from the digitally signed references to the sub-playlist documents; and
   providing the protected master playlist document for use in the video streaming on demand system.

2. The method of claim 1, comprising repeating the digitally signing periodically using different private encryption keys.

3. A method comprising:
   requesting video in a content delivery system;
   receiving, at a device, a master playlist document for the requested video, the master playlist document comprising digitally signed references to sub-playlist documents that reference video documents;
   selecting a digitally signed reference from the master playlist document;
   performing authentication with a server computer using the selected digitally signed reference;
   accessing a sub-playlist document corresponding to the selected digitally signed reference after the authentication; and
   playing the video using the sub-playlist document;
   wherein the sub-playlist document comprises digitally signed sub-playlist references to encrypted video fragments, and playing the video using the sub-playlist document comprises, for each of the digitally signed sub-playlist references selected during the playing:
   performing authentication using the selected digitally signed sub-playlist reference;
   retrieving an encrypted video fragment corresponding to the selected digitally signed sub-playlist reference after the authentication for the digitally signed sub-playlist reference;
   decrypting the encrypted video fragment; and
   displaying the decrypted video fragment;
   wherein the digitally signed references to the sub-playlist documents and the digitally signed sub-playlist references are digitally signed Universal Resource Locators (URLs) set to expire after a specified time frame.

4. The method of claims 3, wherein the master playlist document is dynamically generated, and the method comprises:
   receiving a digitally signed Universal Resource Locator (URL) to the master playlist document; and
   requesting the master playlist document using the digitally signed URL before receipt of the master playlist document.

5. The method of claim 4, wherein the digitally signed URL to the master playlist document is encoded using an identifier of the device and is set to expire after a specified time frame.

6. A system comprising:
   a server environment configured to provide video streaming on demand over a content distribution network, wherein the server environment comprises a storage device and a processor programmed to obtain a master playlist document comprising references to sub-playlist documents that reference video documents, parse the master playlist document to extract the references, digitally sign the references, generate a protected master playlist document from the digitally signed references, and store the protected master playlist document in the storage device; and
   a computing device configured to request video from the server environment via the content distribution network, receive the protected master playlist document in response to the request, select a digitally signed reference from the protected master playlist document, perform authentication using the selected digitally signed reference, access a sub-playlist document corresponding to the selected digitally signed reference after the authentication, and play the video using the sub-playlist document;
   wherein each of the sub-playlist documents includes sub-playlist references to encrypted video fragments, and the processor is programmed to obtain the sub-playlist documents, and for each of the sub-playlist documents, parse the sub-playlist document to extract the sub-playlist references and digitally signing the sub-playlist references;
   wherein the references to the sub-playlist documents and the sub-playlist references to encrypted video fragments are Universal Resource Locators (URLs); and
   wherein the processor is programmed to digitally sign the URLs using an identifier of the computing device and such that they expire within a specified time frame.

7. The system of claim 6, wherein the computing device is configured to play the video using the sub-playlist document by performing operations comprising, for each of the digitally signed sub-playlist references selected from the sub-playlist document:
   performing authentication using the selected digitally signed sub-playlist reference;
   retrieving an encrypted video fragment corresponding to the selected digitally signed sub-playlist reference after the authentication for the selected digitally signed sub-playlist reference;

decrypting the encrypted video fragment; and displaying the decrypted video fragment.

8. The system of claim 6, wherein the processor is programmed to digitally re-sign the references to the sub-playlist documents and the sub-playlist references periodically.

9. The system of claim 6, wherein the processor is programmed to generate the protected master playlist dynamically in response to the request, and the computing device is configured to perform operations comprising:

receiving a digitally signed Universal Resource Locator (URL) to the protected master playlist document; and requesting the protected master playlist document using the digitally signed URL before receipt of the protected master playlist document.

10. The system of claim 9, wherein the digitally signed URL to the protected master playlist document is encoded using an identifier of the computing device and is set to expire after a specified time frame.

11. The system of claim 6, wherein the content distribution network comprises a mobile device network, and the computing device comprises a mobile communication device.

12. The system of claim 6, wherein the master playlist document and the sub-playlist documents are records in a database implemented by the processor using the storage device.

* * * * *